United States Patent
Anand et al.

(10) Patent No.: US 10,455,303 B2
(45) Date of Patent: *Oct. 22, 2019

(54) PACKET-OPTICAL IN-BAND TELEMETRY (POINT) FLOW TRACING AND PROOF-OF-TRANSIT

(71) Applicant: Infinera Corporation, Sunnyvale, CA (US)

(72) Inventors: Madhukar Anand, Fremont, CA (US); Ramesh Subrahmaniam, Fremont, CA (US); Radhakrishna Valiveti, Union City, CA (US)

(73) Assignee: Infinera Corporation, Sunnyvale, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/840,606

(22) Filed: Dec. 13, 2017

(65) Prior Publication Data

US 2019/0014036 A1 Jan. 10, 2019

Related U.S. Application Data

(60) Provisional application No. 62/528,964, filed on Jul. 5, 2017.

(51) Int. Cl.
*H04Q 11/00* (2006.01)
*H04L 12/721* (2013.01)
(Continued)

(52) U.S. Cl.
CPC ..... *H04Q 11/0067* (2013.01); *G06F 16/2322* (2019.01); *G06F 16/2477* (2019.01);
(Continued)

(58) Field of Classification Search
CPC .. H04Q 11/0067; H04Q 9/02; H04Q 11/0066; H04Q 11/0005;
(Continued)

(56) References Cited

U.S. PATENT DOCUMENTS 9,729,433 B2 * 8/2017 Polland ................... H04L 45/36
2005/0120115 A1 * 6/2005 Weedmark .......... H04L 12/5601
709/225

(Continued)

OTHER PUBLICATIONS

RAD Data Communications Ltd. "Ethernet OAM Standards Reference Guide". 7 pages. Dec. 2007.
(Continued)

*Primary Examiner* — Kibrom T Hailu
(74) *Attorney, Agent, or Firm* — David L. Soltz

(57) ABSTRACT

A method and system for flow tracing for use in a packet-optical network is disclosed herein. A device in the packet-optical network may receive a packet including a header and payload. The device may read intent information from the header, and translate the intent information to generate a device-specific action in an optical layer to provide one or more globally unique identifiers (IDs) associated with the device. The device may execute the device-specific action in the optical layer to generate a response including the globally unique IDs corresponding to the intent, where the response forms part of the flow trace. The device may associate the response with the intent, and encode the response for downstream data forwarding. The device may further add multi-layer proof-of-transit (POT) information to the response that may be used to securely verify the path indicated in the SmartFlow flow trace.

20 Claims, 6 Drawing Sheets

(51) Int. Cl.
| | |
|---|---|
| H04J 14/02 | (2006.01) |
| H04L 29/06 | (2006.01) |
| H04M 11/00 | (2006.01) |
| H04Q 9/02 | (2006.01) |
| G06F 16/2458 | (2019.01) |
| G06F 16/23 | (2019.01) |
| H04J 3/06 | (2006.01) |
| H04L 9/32 | (2006.01) |
| G06F 16/901 | (2019.01) |
| H04L 9/08 | (2006.01) |
| H04L 12/709 | (2013.01) |
| H04L 12/46 | (2006.01) |

(52) U.S. Cl.
CPC ........ *G06F 16/9014* (2019.01); *H04J 3/0673* (2013.01); *H04J 14/0267* (2013.01); *H04L 9/085* (2013.01); *H04L 9/3242* (2013.01); *H04L 9/3297* (2013.01); *H04L 45/38* (2013.01); *H04L 69/22* (2013.01); *H04M 11/002* (2013.01); *H04Q 9/02* (2013.01); *H04Q 11/00* (2013.01); *H04Q 11/0066* (2013.01); *H04L 12/4633* (2013.01); *H04L 12/4641* (2013.01); *H04L 45/245* (2013.01); *H04Q 11/0005* (2013.01); *H04Q 2011/0083* (2013.01)

(58) Field of Classification Search
CPC ......... H04Q 2011/0083; G06F 16/9014; G06F 16/2477; G06F 16/2322; H04J 3/0673; H04J 14/0267; H04L 9/3242; H04L 9/3297; H04L 45/38; H04L 69/22; H04L 12/4633; H04L 12/4641; H04L 45/245; H04M 11/002
See application file for complete search history.

(56) References Cited

U.S. PATENT DOCUMENTS

| | | | | |
|---|---|---|---|---|
| 2009/0248873 | A1* | 10/2009 | Johnsson | H04L 29/12066 709/226 |
| 2013/0156035 | A1* | 6/2013 | Lim | H04L 63/12 370/392 |
| 2018/0287938 | A1* | 10/2018 | Han | H04L 45/74 |
| 2019/0014036 | A1* | 1/2019 | Anand | H04L 45/38 |

OTHER PUBLICATIONS

Bosshart et al., "P4: Programing Protocol Independent Processors", AACM SIGCOMM Computer Communication Review. vol. 44, No. 3. pp. 88-95. Jul. 2014.
Kim et al., "In-band Network Telemetry (INT)" Jun. 2016.
"Traffic Monitoring Using sFlow," http://www.sflow.org/sFlowOverview.pdf, Available at: https://web.archive.org/web/20170926195635/http://www.sflow.org/sFlowOverview.pdf (Aug. 5, 2003).
Marc Lavine, "sFlow Version 5", http://www.sflow.org/sflow_version_5.txt. Jul. 2004.
"OpenConfig FAQ for Operators" http://www.openconfig.net/docs/faq-for-operators/, Jun. 2015.
"OpenConfig FAQ" http://www.openconfig.net/docs/faq/, Oct. 2014.
Edelman, "OpenConfig, Data Models, and APIs", http://jedelman.com/home/openconfig-data-models-and-apis/, Avaiable at: https://web.archive.org/web/20151229023001/http://jedelman.com/home/openconfig-data-models-and-apis/ (Dec. 29, 2015).
Jeyakumar et al. "Millions of Little Minions: Using Packets for Low Latency Network Programming and Visibility" SIGCOMM'14, Aug. 17-22, 2014, Chicago, IL, USA.

F. Brockners, S. Bhandari, S. Dara, C. Pignataro, J. Leddy, S. Youell, "Proof-of-Transit" https://datatracker.ietf.org/doc/draft-brockners-proof-of-transit. Oct. 30, 2017.
Nikhil Handigol, Brandon Heller, Vimalkumar Jeyakumar, David Mazi'eres, Nick McKeown, "I Know What Your Packet Did Last Hop: Using Packet Histories to Troubleshoot Networks", 11th USENIX Symposium on NDSI, Apr. 2-4, 2014.
Alizadeh et al., "CONGA: Distributed Congestion Aware Load Balancing for Data Centers", Proceedings of the ACM Conference on SIGCOMM, Aug. 17-22, 2014, Chicago, IL, USA.
Gupta et al., "Network Monitoring as a Streaming Analytics Problem". In Proceedings of the 15th ACM Workshop on Hot Topics in Networks, HotNets-XV, Nov. 9-10, 2016, Atlanta, GA, USA pp. 106-112.
Madhukar Anand, Ramesh Subrahmaniam, Radhakrishna Valiveti. "Unifying Real-Time Telemetry for Fun and Profit in Jacket-Optical Networks". In Proceedings of Photonics Networks and Devices, Advanced Photonics Conference, Jul. 24-27, 2017, New Orleans, USA.
Shamir, "How to Share a Secret" Communications of the ACM, Nov. 1979. vol. 22, No. 11. pp. 612-613.
Pignataro et al., "Layer Independent OAM Management in the Multi-Layer Environment (LIME)" https://datatracker.ietf.org/wg/lime/charter/. Availabkle at: https://web.archive.org/web/20150409203507/https://datatracker.ietf.org/wg/lime/charter/ (Apr. 9, 2015).
Trammell et al., "mPlane: an Intelligent Measurement Plane for the Internet," IEEE Communications Magazine, vol. 52, No. 5, pp. 148-156, May 2014.
Brockners, et al., "Proof of Transit" https://www.ietf.org/archive/id/draft-brockners-proof-of-transit-03.txt. Mar. 13, 2017.
Mizrahi et al., "The Case for Data Plane Timestamping", https://sites.google.com/site/talmizrahihome/files/DPT-SWFAN-Presentation.pdf. IEEE INFOCOM Workshop on Software-Driven Flexible and Agile Networking (SWFAN), Israel Institute of Technology, Apr. 2016.
Mizrahi et al., "The Case for Data Plane Timestamping in SDN" https://arxiv.org/pdf/1602.03342.pdf, IEEE INFOCOM Workshop on Software-Driven Flexible and Agile Networking (SWFAN),Technical Report, Feb. 2016.
Eppstein et al., "What's the Difference? Efficient Set Reconciliation without Prior Context" SIGCOMM'11, Aug. 15-19, 2011, Toronto, Ontario, Canada. pp. 218-229.
Lang, "Clock Recovery and Channelized SDH/SONET", http://www.chronos.co.uk/files/pdfs/itsf/2008/Day3/Clock_Recovery_and_Channelized_SONET-SDH_%28Tao_Lang,_Wintegra%29.pdf. Time & Synchronisation in Telecoms Conference 2008.
Mizrahi et al., "Network Service Header (NSH) Context Header Allocation: Timestamp" https://datatracker.ietf.org/doc/draft-mymb-sfc-nsh-allocation-timestamp. Aug. 20, 2017.
Li et al., "On Data Aggregation with Secure Bloom Filter in Wireless Sensor Networks", http://cacruwaterloo.ca/techreports/2010/cacr2010-22.pdf. University of Waterloo, Waterloo, Ontario, Canada. Available at: https://web.archive.org/web/20170829012307/http://cacr.uwaterloo.ca/techreports/2010/cacr2010-22.pdf (Aug. 29, 2017).
Brockners et al., "Next-gen Network Telemetry is Within Your Packets: In-band OAM" https://www.slideshare.net/frankbrockners/nextgen-network-telemetry-is-within-your-packets-inband-oam. Cisco, 2016.
Kumar et al., "Energy Efficient Secure Data Aggregation in Wireless Sensor Networks" http://isc.mst.edu/media/research/isc/documents/research/symposium/2011/Energy_Efficient_Secure_Data_Aggregation_in_WSNs.pdf. Proceedings of the 5th Annual ISC Research Symposium ISCRS 2011, Apr. 7, 2011, Rolla, Missouri.
Brockners et al., "Data Fields for In-situ OAM" https://datatracker.ietf.org/doc/draft-ietf-ippm-ioam-data/?include_text=1. Oct. 30, 2017.

* cited by examiner

| Src.IP | Dest.IP | TTL | Type | Switch ID |
|---|---|---|---|---|
| 11.1.7.7 | 12.1.3.16 | 64 | 0001 | DC1-SRC |
| 11.1.7.7 | 12.1.3.16 | 63 | 0001 | DC1-POG |
| 11.1.7.7 | 12.1.3.16 | 62 | 0001 | DC1-CX1 DC2-CX1 DC2-POG |

| Src.IP | Dest.IP | TTL | Type | Switch ID |
|---|---|---|---|---|
| 11.1.7.7 | 12.1.3.19 | 64 | 0002 | DC1-SRC |
| 11.1.7.7 | 12.1.3.19 | 63 | 0002 | DC1-POG |
| 11.1.7.7 | 12.1.3.19 | 62 | 0002 | DC1-CX1 Tx EDFA OPR:-15.6061dBm -15.5952dBm -15.6029dBm DC2-POG |

```
0001.resp
Src.IP    Dest.IP     TTL  InID  Switch ID   Timestamp
11.1.7.7  12.1.3.16   64   0001  DC1-SRC     18:33:01.426565
11.1.7.7  12.1.3.16   63   0001  DC1-POG     18:33:01.442975
11.1.7.7  12.1.3.16   62   0001  (DC1-CX1 DC2-CX1: 0.006000007840101)
                                  DC2-POG    18:33:01.485046
```

FIG. 6

```
Collated Responses:
0002.resp
Src.IP    Dest.IP     TTL  InID  Switch ID
11.1.7.7  12.1.3.19   63   0002  DC1-POG (DC1-CX1 DC2-CX1) OpState/Fault: up, None
11.1.7.7  12.1.3.19   62   0002  DC2-POG
```

FIG. 7A

```
0002.resp
Src.IP    Dest.IP     TTL  InID  Switch ID
11.1.7.7  12.1.3.19   63   0002  DC1-POG DC1-CX1 OpState/Fault: admin-down, RX-OLOS
```

FIG. 7B

PACKET-OPTICAL IN-BAND TELEMETRY (POINT) FLOW TRACING AND PROOF-OF-TRANSIT

CROSS REFERENCE TO RELATED APPLICATIONS

This application claims the benefit of U.S. Provisional Application No. 62/528,964, filed Jul. 5, 2017, which is incorporated by reference as if fully set forth.

FIELD OF INVENTION

The disclosure relates generally to a system and method for flow tracing and proof-of-transit in an in-band packet-optical telemetry framework.

BACKGROUND

Network telemetry involves the use of automated tools and processes designed to collect measurements and other data at points throughout the network, which can then be used for network monitoring and performance analysis.

An application of network telemetry is flow or route tracing, which involves getting a list of identities (IDs) of devices traversed by a traffic flow through a network. The traceroute network diagnostic tool is an example of an Internet protocol (IP)-centric route tracing tool that provides a list IP addresses and/or translated domain name system (DNS) names to indicate the nodes visited by an IP packet in a network. Implementations of traceroute is inherently linked to packet networks and is limited to gathering information about the network nodes and links, but is not able to provide more detailed information about the traffic flow.

The In-band Network Telemetry (INT) framework, developed for packet networks, is implemented in the data plane (e.g., the part of each network node's architecture that makes forwarding decisions for incoming packets) such that telemetry information is carried in data packets (e.g., in the header of data packets) and can get modified with each hop. The INT framework has implemented extensions to traceroute that operate on a flow-basis. With INT, a packet may be instrumented with a proof of transit (POT) header that securely records the route of each packet flow as it traverses an intermediate network device along with some auxiliary information such as the queue length or geographical information of the device servicing the packet. A verifier may be used to verify the path of the packet flow by comparing the recorded value of POT header as received in the packet with the expected value.

The Internet Engineering Task Force (IETF) has a draft standard that describes an In-situ Operations, Administration, and Maintenance (IOAM) telemetry tool, also for packet networks, that is designed to record operational and telemetry information in the packet while the packet traverses a path between two nodes in the network. The IOAM telemetry tool collects telemetry information on tracing nodes, ingress/egress interfaces and some generic attributes. According to IOAM, generic data includes format-free information where syntax and semantic of the information is defined by the operator in a specific deployment, which is interpreted by all IOAM nodes the same way. Examples of generic IOAM data include geo-location information (location of the node at the time the packet was processed), buffer queue fill level or cache fill level at the time the packet was processed, or a battery charge level.

However, existing route (flow) tracing solutions, including traceroute and IOAM, are not designed to perform telemetry or route tracing over multiple network layers, such as packet and optical, or different sublayers or encapsulations (e.g., IP in IP, IP and Multiprotocol Label Switching (MPLS), or IP and Virtual Extensible LAN (VXLAN)). Moreover, existing flow tracing solutions do not include such services and network functions as encryption, load balancing, or network firewalls.

For example, if traceroute or IOAM were used in a packet-optical network, then the optical segment(s) of the network would not be able to provide route trace information and the list of nodes traversed by the traffic flow would be incomplete. Moreover, traceroute or IOAM are not equipped to prove that a specific list of nodes was traversed.

SUMMARY

A method and system for flow tracing for use in a packet-optical network is disclosed herein. A device in the packet-optical network may receive a packet including at least a header and a payload at a packet layer. The device may read intent information from the header, where the intent information indicates a request for flow tracing information. The device may translate the intent information from the packet layer to generate a device-specific action in an optical layer to provide one or more globally unique identifiers (IDs) associated with the device. The device may execute the device-specific action in the optical layer to generate a response including the globally unique IDs corresponding to the intent, where the response forms part of the SmartFlow flow trace. The device may associate the response with the intent, and encode the response for downstream data forwarding. The device may further add multi-layer proof-of-transit (POT) information to the response that may be used to securely verify the path indicated in the SmartFlow flow trace.

BRIEF DESCRIPTION OF THE DRAWINGS

FIGS. 5A and 5B show samples of collected responses (traces) for respective flows, which were each traced using the smart flow trace intent as described above for the example network topology of FIG. 4;

FIG. 6 shows another example trace using smart flow trace for the example network topology of FIG. 4;

FIGS. 7A and 7B show example traces using smart flow trace for a multi-layer ping application tested in the example network topology of FIG. 4.

DETAILED DESCRIPTION OF THE EMBODIMENTS

Figure 1:
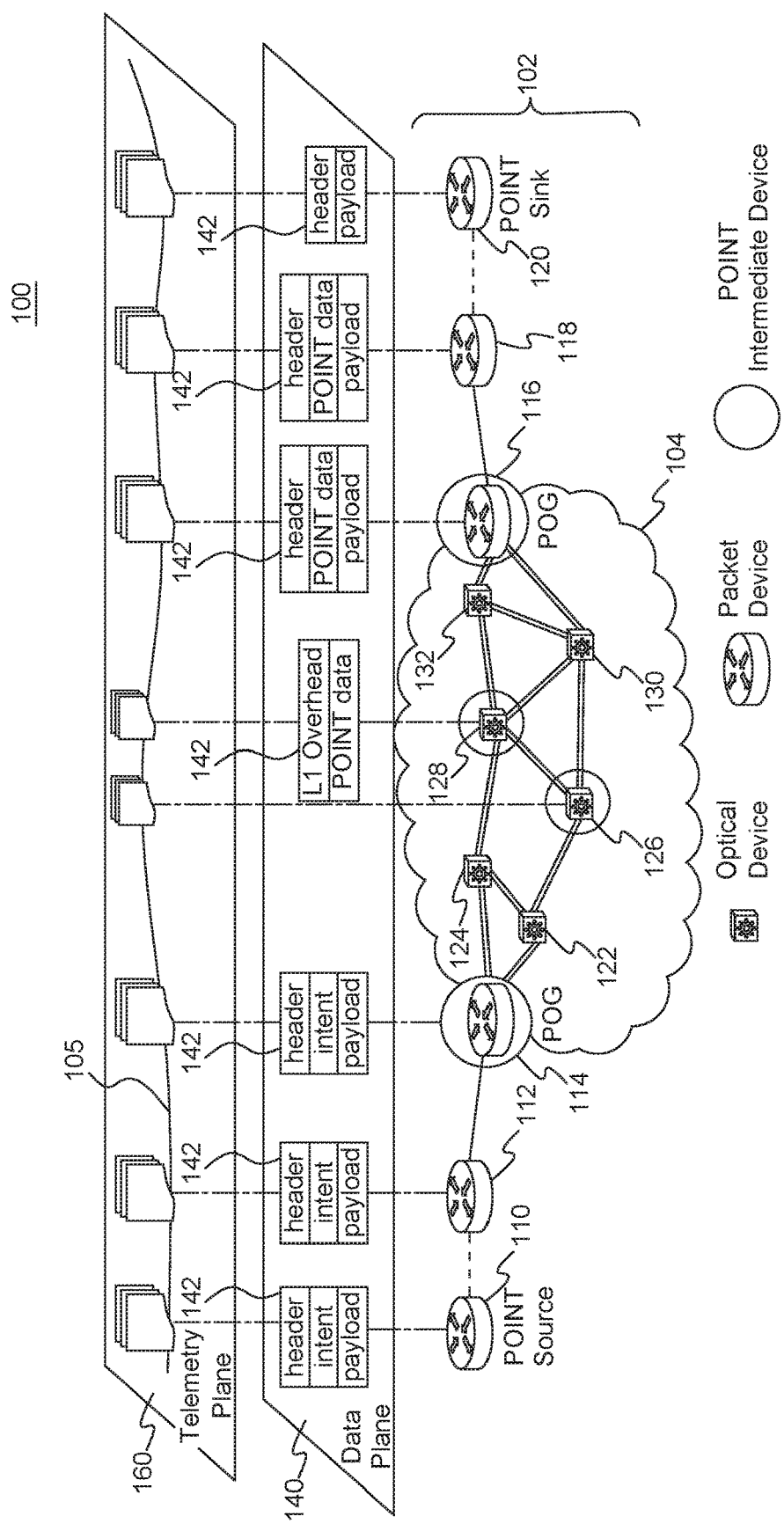
FIG. 1 is a high-level diagram of an example POINT framework implemented in an example packet-optical network, in accordance with the disclosures herein.

As described herein, a disclosed flow (route) tracing system and method obtains a list of identities (IDs) and/or other relevant information of devices traversed by a traffic flow in a multi-layer network, such as a packet-optical network. The flow tracing information may include proof that a traffic flow traversed a specific network path (e.g., a packet-optical path in a packet-optical network), which may be defined by a set of network nodes (devices), the ports within nodes, the links between nodes, and/or other functions and services (e.g., software-based load balancers, network firewall applications). The flow tracing information may also capture information regarding virtual components (e.g., containers, virtual machines (VMs), virtual switches/routers, virtual network functions (VNF), and/or virtual routing and forwarding (VRF) instances) along the network path.

The disclosed flow tracing system and method, referred to as SmartFlowTrace or smart flow trace, may be implemented within the packet-optical in-band telemetry (POINT) framework and can provide any of the following telemetry information regarding a packet-optical path: enumerated list(s) or additional information regarding nodes, ports within a node, services at a node (e.g., software load balancers, software firewalls, policing services, filtering services, etc.), and/or links along the packet-optical path; information on the exact traversed path defined by a specific set nodes, ports within nodes, services within a node and links; information on the exact path in terms of hardware components (e.g., queues, pipeline stages, internal ports, tables, etc.) and/or software components within a node (e.g., information about software switches such as IP tables, container/VM IDs and Virtual Routing and Forwarding (VRF) information); and/or information on virtual components in the network (e.g., VNFs).

The emergence of integrated packet and optical networks, or "packet-optical networks", such as those interconnecting data centers, see additional challenges when it comes to network telemetry because of the different types of telemetry data collected in packet versus optical networks. For example, the telemetry data collected in a packet layer of a packet network, such as packet loss and latency, on a per-flow basis cannot be easily attributed to or correlated with data collected in the optical layer of an optical networks, such as bit error rates (BERs) and quality factor (Q-factor). Moreover, the optical network lacks the digital constructs used by telemetry solutions such as INT, and the packet layer does not have access to measurements in the optical network. A further challenge occurs in associating packet flow telemetry data with the corresponding data from optical transport network (OTN) layers, which involves piecing together telemetry data from many devices.

Optical parameters may affect traffic flows. For example, if a link experiences degradation in the Q-factor that hasn't resulted in the complete failure of the link, operators can use the knowledge of that information to proactively move critical applications away from that particular link. In such cases, it is useful for network operators to be able to monitor optical parameters over time to use in routing and other applications.

Thus, the POINT framework was developed (as described in U.S. patent application Ser. No. 15/801,526, which is incorporated herein by reference in its entirety) to achieve end-to-end correlation of collected network state data in mixed networks with multiple network layers, such as packet-optical networks.

According to the POINT framework, a source device inserts an intent (POINT intent) for telemetry data collection along with the data flow. The intent communicates the parameters of data collection such as conditions for data collection, entities being monitored, and the type of data to be collected for the flow. Intermediate devices on the path of the data flow that are the target of the intent process the high-level intent, translate the intent into a suitable device-specific action for data collection and execute the action to collect an intent response. At a layer boundary, such as packet to optical, or across optical layers such as a hierarchy of optical data units (ODUs), intermediate devices translate the intent and response using a layer-appropriate mechanism. For example, in the packet network, the intent and response may be encapsulated using IP options or VXLAN metadata header. At the packet-optical boundary, the intent can be retrieved from the packet header, and translated and encapsulated as ODU layer metadata, which remain accessible to all nodes along the end-to-end path of the ODU.

In another example, the POINT intent can be translated into an appropriate query for telemetry data collection via the management plane of the optical devices. As soon as the response of data collection is ready, it is communicated through the optical network and translated appropriately into a packet or packet header at the packet-optical boundary and forwarded to the sink for analysis. For example, the response communication may be out-of-band using the optical supervisory channel (OSC).

Thus, the POINT framework provides hierarchical layering with intent and response translation at each layer boundary, and mapping of the intent to layer-specific data collection mechanism, such that the POINT framework can be deployed across a network layer hierarchy. The POINT framework also provides for fate sharing of telemetry intent and data flow. Telemetry data for a specific data flow can be collected in-band as the data traverses the network layers. By design, intent responses can be out-of-band to accommodate scenarios such as troubleshooting networks when there is no connectivity between the source and the sink. Additionally, intents are high level instructions for data collection and can be mapped to existing data collection mechanisms between two POINT capable intermediate network devices.

FIG. 1 is a high-level diagram of an example POINT framework 100 implemented in an example packet-optical network 102, in accordance with the disclosures herein. The example packet-optical network 102 includes packet devices 110, 112, 114, 116, 118 and 120, and an optical network 104 segment that includes optical devices 122, 124, 126, 128, 130 and 132. The POINT framework 100 can operate over an optical network 104 with Layer-0 (L0) and/or Layer-1 (L1) circuits. The packet devices include a POINT source device 110 and a POINT sink device 120, as well as packet optical gateways (POGs) 114 and 116 located at the interfaces between the packet segments and optical network 104 segment of the packet-optical network 102. The packet devices 110, 112, 114, 116, 118 and 120, can operate at the packet layer, for example at layer 2 (L2)/layer 3 (L3) (e.g., L2 may be a data link layer and L3 may be a network layer, which exist above a physical layer). POGs 114 and 116 are also connected via lower layer devices, such as L1/L0 devices 122, 124, 126, 128, 130 and 132. In the example packet-optical network 102, POGs 114 and 116 and optical devices 126 and 128 are configured as POINT intermediate devices (i.e., devices with digital capability to interpret POINT intent, translate it across layers, and aggregate and propagate the telemetry state information in the packet-optical network 102).

According to the POINT framework 100, telemetry information for a packet-optical traffic flow 105, such as intent or POINT data (e.g., intent and response), in the packet-optical network 102 is gathered in the data plane 140 as part of the information carried in the network 102, as described below. The telemetry plane 160 represents the telemetry information for the packet optical flow 105 being mapped and correlated across network layers, constructs (e.g., sub-network connections (SNC) signifying an end-to-end or a portion of end-to-end optical connection, label-switched path (LSP), or virtual local area network (VLAN)) and devices operating at different layers in the networking stack to give the end user (e.g., at the POINT sink) a unified view of the operation of the entire packet-optical network 102.

In accordance with the disclosed POINT framework 100, a POINT source device 110 may initiate a network telemetry data collection for a packet-optical flow 105 along a packet-optical data path from the source device 110 to a sink device 120. Along the packet-optical data path, POINT intermediate devices, such as POGs 114, 116, and optical devices 126, 128, may interpret the intent, collect the desired telemetry data, and encode it back into the packet (flow) 142, which eventually gets forwarded to the sink device 120. For example, as packet (frame) 142 traverses the packet-optical network 102 across devices and layers (e.g., packet layers L2/L3 and optical layers L1/L0), in the data plane 140 intent information is transferred into other layers, translated into device-specific actions, and responses are collected (e.g., added to POINT data in packet 142) for use at the POINT sink device 120. At the sink device 120, the collected telemetry data for the packet-optical flow 105 (collected from POINT source device 110 to POINT sink device 120) is processed as needed by the intended applications. Examples of telemetry data processing may include triggering a report to a management entity (e.g., using mechanisms like OpenConfig) or archiving collected data in a storage device.

Figure 2:
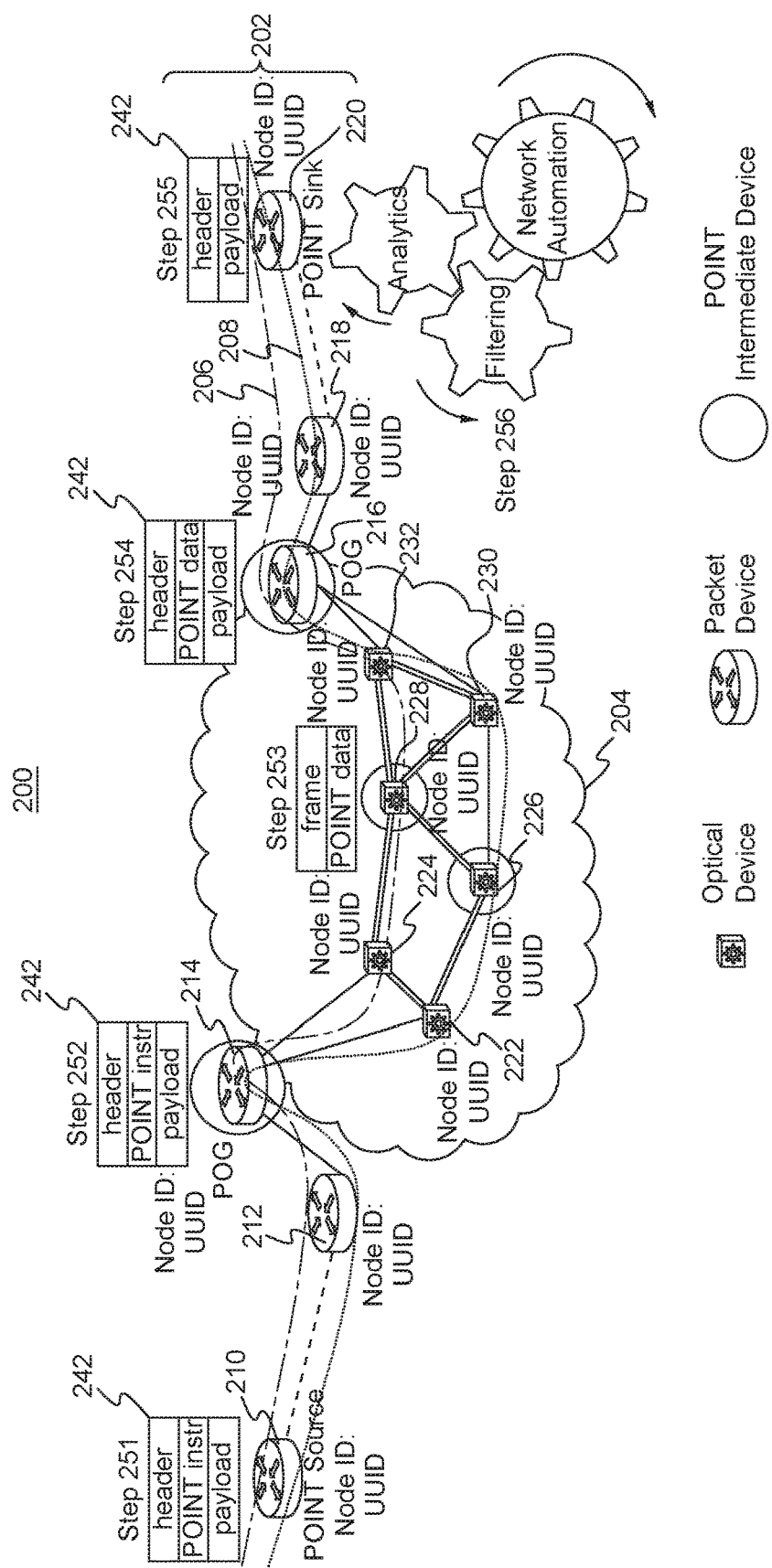
FIG. 2 is a high-level diagram of an example of FlowTrace flow tracing application implemented in the POINT framework in an example packet-optical network, in accordance with the disclosures herein.

The disclosed smart flow trace flow tracing method and system (also referred to as SmartFlowTrace, FlowTrace or flow trace), which may be implemented within the POINT framework, inserts smart flow trace instructions as POINT intent that is processed in-band (i.e., in the data plane without requiring intervention by the control plane). FIG. 2 is a high-level diagram of an example of FlowTrace flow tracing application implemented in the POINT framework 200 in an example packet-optical network 202, in accordance with the disclosures herein. The example packet-optical network 202 includes packet devices 210, 212, 214, 216, 218 and 220, and an optical network 204 segment that includes optical devices 222, 224, 226, 228, 230 and 232. The packet devices include a POINT source device 210 and a POINT sink device 220, as well as POGs 214 and 216 located at the interfaces between the packet segments and optical network 204 segment of the packet-optical network 202. In this example, two paths are shown for gathering smart flow trace information: path 206 (dot-dashed line) that passes through devices 210, 212, 214, 224, 228, 232, 216, 218 and 220; and path 208 (dotted line) that passes through devices 210, 212, 214, 222, 226, 230, 232, 216, 218 and 220. Each path 206 and 208 includes both packet and optical nodes, such that the optical nodes may or may not have IP addressability. As traffic flows along a path 206 (or 208), flow tracing information is gathered and corresponding response entries are inserted into the traffic flow to be forwarded to the POINT sink device 220 for processing.

When a packet 242 containing FlowTrace intent is received at a device (e.g., at an intermediate POINT device) along the network path 206 (or 208), the intent is processed using POINT framework mechanisms. The intent may indicate a request for flow tracing information. For example, the device may decode the FlowTrace intent, translate the intent into a local device-specific action to request the appropriate ID of the device and/or entities associated with the device for flow tracing, and generate a POINT response containing the appropriate IDs and/or other tracing information. The POINT response may be inserted in the POINT packet 242 for forwarding to the POINT sink node 220, or the POINT response may be sent via an alternate chosen channel toward the POINT sink node 220. The appropriate device ID ("NodeID") and/or other tracing information provided as a response to the FlowTrace intent for flow tracing may include, but is not limited to include, one or more universally unique IDs (UUID) (e.g., version 3 or version 5 UUID). A UUID may be used to identify information in a computer network or system, and thus can be used to uniquely identify nodes (devices), links, paths, services and ports, among other things, along a network path. The UUID may include, for example, a variety of naming information to uniquely identify network entities. In an example, the UUID may be 16 bytes in length. However, any length global identifier or UUID may equivalently be used. For example, where naming requires more than 16 bytes, an identifier of greater than 16 bytes may be used.

Thus, a POINT response to a request triggered by FlowTrace intent at a device may include multiple UUIDs (or, more generally, any unique identifiers) to provide information on relevant nodes, links, paths, services and/or ports along the network path (e.g., node, ingress port (IngP), virtual network function 1 (VNF1), VNF2, egress port (EgP), link, etc.). In an example, the POINT intent carries the granularity at which the tracing should be done by specifying which elements to include in the flow trace (e.g., any one or more of devices, links, services, ports/interfaces etc.).

The UUIDs collected by smart flow trace can be translated into other useable information at the sink node 220. In an example, the collected response information (e.g., UUIDs) may be optimized for record length. For example, in some cases, rather than include a 16 byte UUID value in each response along the network path, only a portion of the UUID value may be communicated with the POINT information such that the part of the UUID value may be uniquely associated with the exact network construct (e.g., device, port, link, etc.) at the sink. For example, if certain network devices being traced have unique last byte UUID values, then only the last byte (least significant byte) of the UUID may be communicated to uniquely convey the identity of such network devices.

FIG. 2 illustrates an example of the processing of FlowTrace POINT data along network path 206 as it travels through the packet-optical network 202 from POINT source node 210 to POINT sink node 220. At step 251, POINT instructions (i.e., POINT intent) are inserted into packet 242 (other information may be present in packet 242 such as header and payload information). At step 252, the POG device 214 translates the POINT intent so that it can be executed by optical devices in the optical network 204. At step 253, the POINT data (intent, response) is carried in an ODU frame 243 and optical node 228 inserts response data into ODU frame 243, such as the UUIDs of the device, ports, and/or links associated with optical node 228. In this case, it is assumed that at step 253 the length of the response data is small enough to be encoded into a dedicated overhead (OH) in the ODU frame 243. However, if the response data does not fit in the OH of the ODU frame 243, it may be forwarded to the sink node 220 via other channels, for example out-of-band using an OSC.

At step 254, the POG device 216 translates the ODU response information and inserts the POINT data into packet 242. At step 255, the POINT sink device 220 receives packet 242 and extracts the POINT data, and at step 256 the POINT sink device 220 processes the received POINT data (e.g., performing analytics, filtering and/or network automation based on the received POINT data). The POINT sink device 220 understands and can translate the UUIDs collected along the network path 206. For example, the sink device 220 can translate the UUIDs gathered in the responses to provide a description of the path and its characteristic in a manner readable by humans, as described further below.

The disclosed smart flow trace method and system provide many benefits over existing flow tracing solutions. For example, smart flow trace can trace services between ingress (e.g., input port or interface to the device) and egress (output port or interface to the device) at a device across layers or sublayers/encapsulations along a network path. As part of smart flow trace, each service has a UUID (or other unique identifier) that can be gathered as part of the smart flow trace information, and each service has the capability to decode and trigger a flow trace. Smart flow trace also handles overlays/underlays or layers in a network, such that a traffic flow carrying smart flow trace (POINT) data across a network can gather flow tracing data across several overlays/underlays such as IP and MPLS sublayers or L1/L2 packet/optical network layers. Smart flow trace is also capable of tracing the exact path of a traffic flow within each node or device by capturing tracing information (e.g., IDs such as UUIDs) of the virtual and physical components within each node.

As explained above, the disclosed smart flow trace method and system can be used to trace network functions and services, including for example network appliances across many different hierarchy and layers. For example, smart flow trace can be used to trace layer 4 (L4) to layer 7 (L7) network appliances, including, but not limited to: server load balancers and application delivery controllers; wide area network (WAN) optimization services; network firewalls; virtual private networks (VPNs) based on Internet Protocol Security (IPSec) and/or Secure Sockets Layer (SSL); and/or intrusion detection and prevention services (IDS/IPS). The disclosed smart flow trace method and system treats network services and functions, including L4-L7 services, as extensions of the data path by specifically tracing the data flows through each entity using the techniques described herein. For example, the following services may be traced as part of smart flow trace tracing: firewall rules that were applied during the processing of a packet/data flow; WAN optimization actions that were performed or policies applied during the processing of a packet/data flow; load balancing performed during the processing of a packet/data flow; and/or virtual function rules (e.g., VNF rules violated by a packet as it traverses the network), internal addresses, and/or ports visited by a packet during the processing of a packet/data flow. The disclosed smart flow trace method and system may provide secure multilayer proof of transit (POT), as described further below, to securely verify the devices traversed in the network path and may also be used to securely verify network services and network function entities traversed along a network path.

The disclosed smart flow trace method and system may employ naming techniques that may be used as part of the unique global identifiers (e.g., UUIDs) so that the flow tracing information can be correctly translated and interpreted across the network, such as at intermediate devices and at the sink device. For example, specialized naming techniques may be used for node naming, port naming and/or link naming that are descriptive of the characteristics of those types of elements in the network.

In an example of node naming, a node name may describe the function of the node in the network. The following are examples of names used for network nodes (other functionally representative names can be used equivalently): RTR for router; PSW for packet switch; BRDG for bridge; MXP for MuxPonder (sends/receives signals over optical fibers); ROADM for reconfigurable add drop multiplexer; and POG for packet optical gateway. In another example, node naming may include geographic location for the device. Thus, an example format for node naming may include the function of the node, location, and node ID (e.g., UUID), as follows: <function>-<continent>-<country>-<node number>. For example, a router located in Germany may have the following node name that is used as a response during FlowTrace: RTR-EU-GER-Node #.

In a further example of node naming, the role of a node within the network topology may be added to the node name, which further qualifies the node's function. Examples of node naming including role in topology information are as follows (format <role><function>-<continent>-<country>-<node number>): P-RTR-EU-GER-Node # where "P" indicates provider, EPOG-SAM-BRA-Node # where "EPOG" indicates egress POG, and S-GW-AM-US-Node # where "S" indicates serving gateway router. As explained above, the naming techniques employed by the disclosed smart flow trace system and method ensure globally unique naming, for example using namespace Version 3 UUID (16 bytes), to uniquely identify each element (e.g., node, port, link, service, etc.) within the flow trace of the network path. Thus, in an example, a POINT device may translate between (to and from) a protocol specific ID (e.g., an IP Address that is only 4 bytes) and a corresponding globally unique identifier (e.g., UUID, 16 bytes) when generating the response information for a received smart flow trace inquiry (i.e., FlowTrace intent).

Port naming, which may be used to trace ingress and/or egress ports of a node along the network path, may provide additional, useful flow tracing information to further qualify the network path. Because ports are generally local to a node, an example of port naming may include adding a port identifier to the node name, for example attaching ".P" and a port number (e.g., .P1, . . . , .P255) to the node name. The port name may be encoded within the space (i.e., bits) provided in the name (identifier) of the corresponding network entity. For link naming, a descriptive name for the link may be used that describes the characteristics of the link, such as, link bandwidth, adjoining nodes, link speed, link protection and/or shared risk link groups (SRLG) properties (e.g., 100G-PE1-PE2 and SRLG1-POG10-POG11). For links considered local to a node (or pair of nodes), the link naming may include adding a link identifier to the node name (or node names for the pair of nodes on either end of the link), for example attaching ".L" and a link number (e.g., .L1, . . . , .L255) to the node name. The link name may be encoded within the space (i.e., bits) provided.

Figure 3:
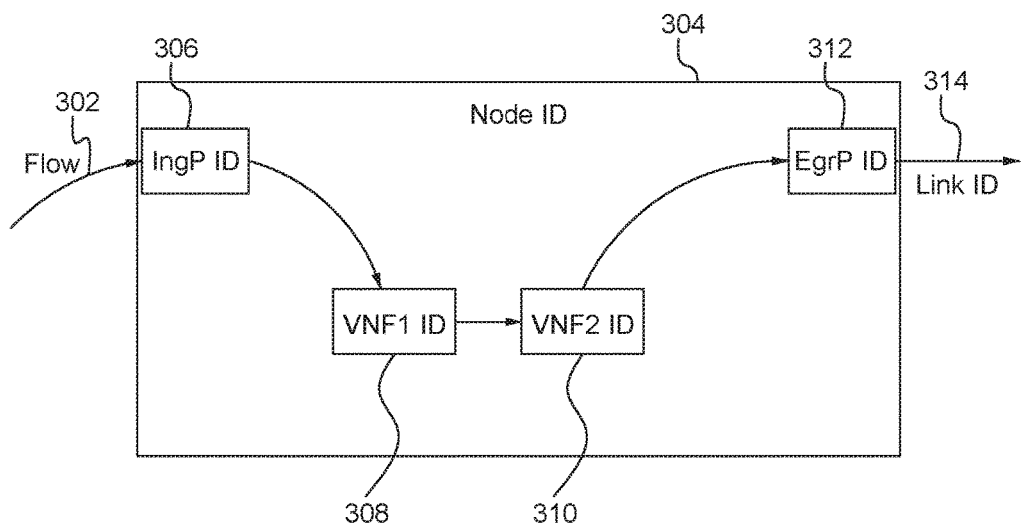
FIG. 3 is a block diagram illustrating an example FlowTrace method as applied to a packet (or frame for optical node) of an incoming track flow passing through a particular node along a network path (not shown)

FIG. 3 is a block diagram illustrating an example FlowTrace method 300 as applied to a packet 302 (or frame for optical node) of an incoming track flow passing through a particular node 304 along a network path (not shown). The node 304 may be, for example, a packet node in a packet segment or an optical node in an optical segment of a packet-optical network. A packet 302 (or frame for an optical node) is first received at node 304 by the ingress port or interface 306. Node 304 is responsible for decoding the received telemetry intent (i.e., SmartFlow instruction or intent) in packet 302, translating the intent and either generating response or triggering device-specific actions to generate the necessary response(s). The split request/response mechanism may be used where the response is sent out-of-band from the request that is carried in-band.

For example, the packet 302 may be processed by various services at node 304, for example by virtual network functions 308 and 310. When processing of the packet 302 at node 304 is complete, the packet 302 is forwarded over link 314 via egress port or interface 312. Thus, a smart flow trace intent in the received packet 302 may instruct the node 304 to record ID information for any or all of the elements of node 304. The ID information for the elements associated with node 304 may be recorded in the order in which the elements are visited by the packet 302. An example order of recorded ID information that may be provided as a response to a request generated by a smart flow trace intent is: Node-ID of node 304, IngP-ID of ingress port 306, VNF1 ID of virtual node 308, VNF2 ID of virtual node 310, EgrP-ID of egress port 312, and link-ID of link 314.

The example FlowTrace method 300 decodes the FlowTrace instructions in-line with the incoming packet 302 (or frame) and starts processing the intent (e.g., translating the intent, performing device-specific actions to generate the appropriate response, etc.) upon receipt of the intent. That is, the node 304 does not hold the packet 302 (or frame) from proceeding further. In some cases not shown, the response may be delayed and associated with the appropriate intent from a subsequent data packet/frame. Other flows, not shown, can share the same physical path as the flow associated with packet 302 (physical link versus logical flows). A particular node, such as node 304, along a network path may have a complex path internal to the node. Thus, according to the disclosed smart flow trace method and system, the ingress port 302 of the node 304 may originate a node-specific telemetry request (e.g., based on the intent in the incoming packet 302) and the egress port 312 may clear the node-specific telemetry request once completed, such that the node-specific telemetry request is processed and responded to by all services and components associated with node 304 along the path of the data flow (e.g., ports 306 and 312, virtual network functions 308 and 310, link 314). For example, VNFs at node 304 not associated with the data packet may not respond to the intent even though they are associated with the node 304.

A network path traversed by a smart flow trace packet or frame may be bookended by ingress and egress nodes (e.g., source and sink nodes, respectfully, as seen in FIGS. 1 and 2). The source node may be the ingress node that generates the FlowTrace request and intent and may also generate and collect a partial (first) response to the FlowTrace request as part of the POINT telemetry data. The sink node may be the egress node that may generate and collect a response to the intent, associate the response with the packet stream and/or clear intent request (assuming the sink node is the final destination of the FlowTrace (POINT) telemetry data. Intermediate nodes (between the source and sink nodes) act to respond to an intent request, but may not originate or clear intent requests.

In an example of source based routing, segment routing (SR) may be used where the route is specified in the packet itself as a series of network segments. In this case, each device along the path translates the segment into an exact path. An instruction or label for the segment (e.g., MPLS label, IPv6 label), which may be for example topology or service based, is carried in the packet, and an ordered list of segments is represented as a stack of labels in the forwarding plane. For smart flow trace route tracing when segment routing is used in the POINT framework, an intent request is originated at headend (e.g., at in ingress node to the route) where the segment list is stacked and a partial response is generated. It is the responsibility of the node along the path executing the next segment in the list to: generate a partial (first) response to the intent request; pass on the intent request if more segments exist in the list; and clear the intent request if no more segments in the list. Nodes executing the next segment are then responsible for responding to the request.

In an example, a segment may be associated to a prefix (i.e., has a global significance) and steers traffic along a shortest path (e.g., shortest-path in terms of equal cost multipath (ECMP) load balancing across multiple equal cost L3 IP-enabled paths) to the prefix. In an example subcase of a prefix segment, a segment may be associated to a node, where the segment allocated to a loopback that identifies a specific node. In another example, an adjacency segment (i.e., identifying a local significance) steers traffic onto an adjacency or a set of adjacencies. For example, an ingress node may enforce a source route of forwarding and service instructions on a flow by appending an SR list to its packets, where the SR list identifies node segment IDs (SIDs) (global) and/or adjacency SIDs (local). The ingress node also attaches a list of intents along with SR list, where each intent corresponds to a (node or adjacency) SID. Then, the nodes identified in a segment process the corresponding intent as each packet traverses the network.

Figure 4:
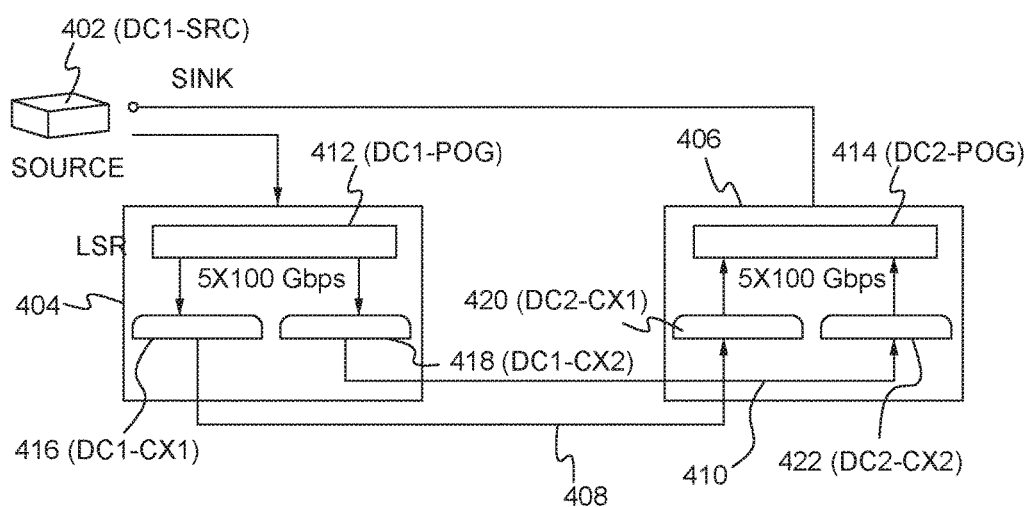
FIG. 4 is a block diagram of the example network topology used to test a prototype implementation of the disclosed smart flow trace flow tracing application in the POINT framework, in accordance with the disclosures herein.

In the following, an example prototype implementation of the disclosed smart flow trace flow tracing application, implemented in the POINT framework, is described. FIG. 4 is a block diagram of the example network topology 400 used to test a prototype implementation of the disclosed smart flow trace flow tracing application in the POINT framework. The example topology 400 includes two network devices 404 and 406 each emulating a datacenter edge and comprising both packet and optical components. Each network devices 404 and 406 is comprised of a 3.2 terabit per second (Tbps) white box POG (packet devices POG 412 (node ID DC1-POG) and POG 414 (node ID DC2-POG), respectively) connected to two 500 gigabit per second (Gbps) compact datacenter interconnect dense wavelength division multiplexing (DWDM) devices (optical devices 416 (node ID DC1-CX1) and 418 (node ID DC1-CX2), and optical devices 420 (node ID DC2-CX1) and 422 (node ID DC2-CX2), respectively). An Ixia packet generator was used as the source node 402 (DC1-SRC) (and sink node) to emanate data flows. While smart flow trace and POINT do not mandate a specific intent format, in this example the intent is configured to include a type, an identifier to associate responses pertaining to a specific flow, and a group identifier indicating the set of devices from which the data is requested (a trigger for data collection, not shown, may also be included for example).

The network topology 400 is used to demonstrate multilayer flow tracing by originating and terminating data flows on the Ixia packet generator 402 (acting as the source and sink node) and routing the data flows from datacenter device 404 to the other datacenter device 406 (acting as a POG) via two equal cost paths 408 and 410 (e.g., layer 3 equal cost multipath (ECMP) load balancing across multiple equal cost L3 IP-enabled paths, 500 Gbps each). In the prototype implementation of FIG. 4, high-level intent was encoded into a three-byte packet header using IP options and a protocol pad between the regular IP header and the payload of each packet. The intent was encoded using the tuple <Intent Type, Intent ID, Group ID>. Intent type 0x01 was used to trace the devices (packet and optical) for a specific flow, and intent type 0x02 was used to gather flow trace with optical power values. The intent ID was assigned the same value as the flow identifier, which is a unique identifier for the traffic flow. The Group ID with value 0x01 indicated data to be collected from all devices and the group ID with value 0x02 indicated that the data be collected from only elements/devices in the first datacenter device 404. The packet devices 416, 418, 420 and 422 were programmed to snoop on the intent header and mirror it to the device CPU for processing (e.g., using a packet analyzer, such as tcpdump that runs under the command line to display packets being transmitted or received over network). At the POGs 412 and 414, the intent was translated into an appropriate query for the device (e.g., Cloud Express (CX)) identified by the egress port of the specific data flow on the POG. Once the result of the query was obtained from the relevant CX, each POG 412 and 414 sent an out-of-band response using user datagram protocol (UDP) to the sink node 402 where all the responses were collated (e.g., using a simple scripting language such as python script).

FIGS. 5A and 5B show samples of collected responses (traces) 500A and 500B for respective flows, which were each traced using the smart flow trace intent as described above for the example network topology 400 of FIG. 4. The following categories/columns of POINT information are shown in the collected responses 500A and 500B: source IP (Src.IP); destination IP (Dest.IP); time-to-live (TTL) is an IP time-to-live value that is decremented along each IP hop of the data path; type indicating that the devices were traced for a specific flow and/or optical power values; and switch ID referring to the device IDs shown in FIG. 4. The collected response 500A pertains to a multi-layer flow trace including both packet and optical tracing information, where type 0001 indicates that the devices were traced for a specific flow. The collected response 500A similarly pertains to a multi-layer flow trace including both packet and optical tracing information, and additionally includes path characteristics such as optical power values in decibels (dB) per milliwatt (mW) (dBm), where type 0002 indicates that the devices were traced for a specific flow and optical power values.

FIG. 6 shows another example trace using smart flow trace for the example network topology 400 of FIG. 4. In addition to Src.EP, Dest.IP, TTL and an intent ID (InID) to distinguish response information from multiple switches, the trace in FIG. 6 includes switch timestamp values of the times at which the packet was received at packet switches (e.g., DC1-SRC, DC1-POG, DC2-POG) and the inter-switch latency at optical switches (e.g., DC1-CX1 and DC2-CX2). Thus, the overall trace shown in FIG. 6 provides a picture of the latency experienced by the data flow as it traversed different devices in the network along a network path.

FIGS. 7A and 7B show example traces using smart flow trace for a multi-layer ping application tested in the example network topology 400 of FIG. 4. In FIG. 7A, the optical link between optical nodes DC1-CX1 and DC2-CX2 is up (i.e., connected), and thus the packet carrying the POINT intent travels across the optical segment of the network path to a remote POG (DC2-POG). In FIG. 7B, the optical link between optical nodes DC1-CX1 and DC2-CX2 is down and thus a fault value (e.g., admin-down, receive optical loss of signal (RX-OLOS)) is recorded as part of the trace.

The disclosed smart flow trace system and method may also include a mechanism for multi-layer POT to securely verify that a traffic flow actually took the path and transited the set of nodes (and functions/services) indicated in the SmartFlow flow trace. As with existing flow tracing solutions, existing POT solutions are limited to a single layer (i.e., the packet layer) and are not designed to operate in multi-layer network such as packet-optical networks, and also are not able to provide POT for such network elements as services ports, or links. For example, existing POT methods may not be applied to optical switches in a network path.

Thus, the disclosed smart flow trace system and method with POT implements POT hierarchically at every layer. For example, a secret polynomial POT approach (e.g., based on Shamir's secret sharing scheme) may be used within the POINT framework across layers, as described in the following. The disclosed multilayer POT method and system, which may be used in packet-optical networks, may be used to prove transit through network services and/or functions, in addition to network devices. For example, like network devices, each network function or service may have a unique ID/secret share that can be appended to the smart flow trace record in a packet carrying POINT data while traversing the network.

For example, secret polynomials corresponding to chosen nodes, links and/or ports at each layer (e.g., at the packet and optical layers) may be distributed (e.g., by a network controller or operator) and communicated to the corresponding nodes (the secret polynomials may be distributed at network setup and kept secret). Then, the source node may generate a random polynomial for each layer (e.g., each of the network and optical layers) and communicates the random polynomial by inserting it into the packet/frame as part of the POINT intent data. Each node along the network path computes a value of a public polynomial using the layer-specific random polynomial carried in the intent data and communicates the computed public polynomial as part of the POINT response data. Each node may similarly perform a public polynomial calculation using the random number for its own service, port, and/or link attributes. At layer crossings (e.g., at nodes, such as POGs, operating at the interface between packet and optical network segments), the POT data (e.g., public polynomial(s)) computed at a lower layer (e.g., optical L0/L1) may be embedded into the response data at the higher layer (e.g., into the L3 packet header). Finally, the sink node, which may act as a POT verifier, may run a POT verification algorithm corresponding to each layer in the network to verify that the public polynomials inserted into the POINT response correspond to the correct nodes (and secret polynomials).

In an example POT solution for a multi-layer network (e.g., a network including a packet layer and an optical layer), a secret and constant polynomial POLY1-PKT is generated for the packet segment of the network. Each intermediate packet device gets one point on the polynomial POLY1-PKT (e.g., the points on POLY1-PKT may be provided to devices by the network controller or operator). A random polynomial POLY2-PKT is assigned per packet, such that each packet gets a random number that is the independent coefficient of the polynomial POLY2-PKT. In an example, the random polynomial POLY2-PKT may be generated as a combination of a timestamp at which the packet was initially originated (e.g., at the source) and a random value. As the packet traverses the packet devices along the network path in the network, each packet device computes the polynomial sum POLY1-PKT+POLY2-PKT using its own point on POLY1-PKT, and forwards the result as part of the POINT data. A verifier (e.g., at the sink device) reconstructs a third polynomial POLY3-PKT and compares it with the value in the packet POINT data to verify that the recorded path in the flow trace is the actual path that was traversed by the packet.

Similarly, for the optical segment of the same network, a secret and constant polynomial POLY1-OPT is generated. Each intermediate optical device gets one point on the polynomial POLY1-OPT (e.g., the points on POLY1-OPT may be provided to devices by the network controller or operator). A random polynomial POLY2-OPT is assigned per frame, such that each frame gets a random number that is the independent coefficient of the polynomial POLY2-OPT. In an example, the random polynomial POLY2-OPT may be generated as a combination of a timestamp at which the packet was initially originated (e.g., at the source) and a random value. As the frame traverses the optical devices in the network, each optical device computes the polynomial sum POLY1-OPT+POLY2-OPT using its own point on POLY1-OPT, and forwards the result as part of the POINT data. A verifier (e.g., at the sink device) reconstructs a polynomials POLY3-PKT and POLY3-OPT compares it with the respective packet and optical polynomial sum values collected in the POINT data to verify that the recorded path in the flow trace is the actual path that was traversed by the packet (i.e., verify the packet/frame transit).

Figure 8:
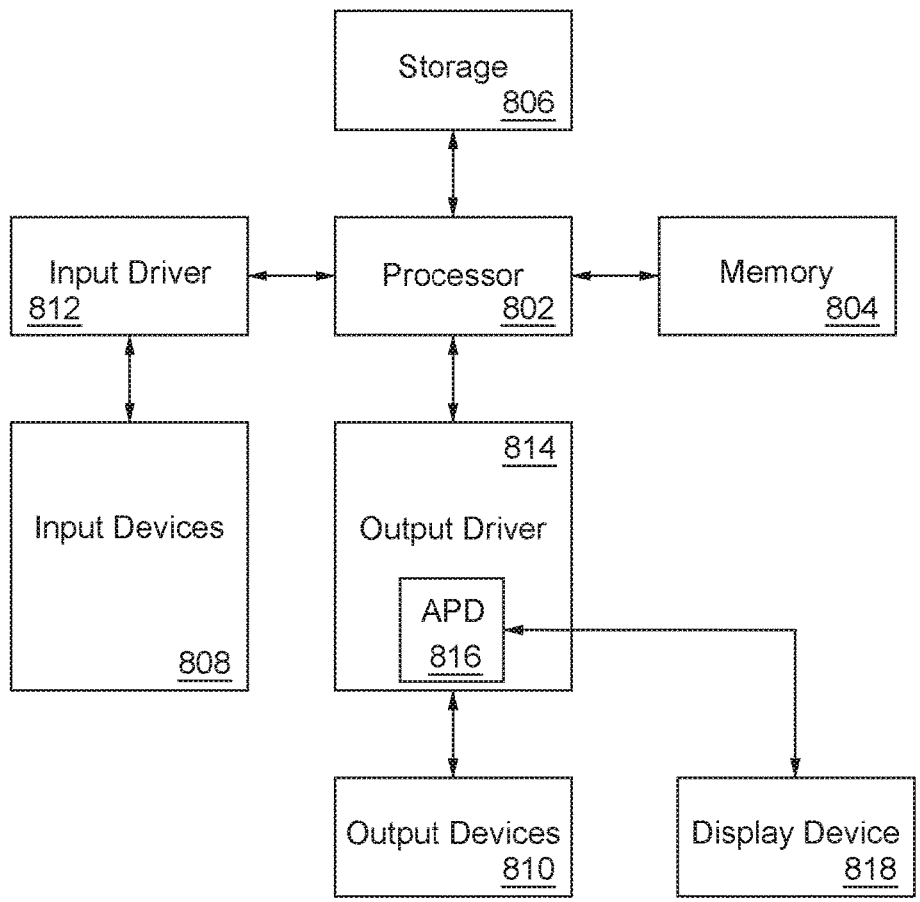
FIG. 8 is a block diagram of a computing system in which one or more disclosed embodiments may be implemented.

In an example, the disclosed smart flow trace method and system, and any subset or one or more component(s) thereof, may be implemented using software and/or hardware and may be partially or fully implemented by computing devices, such as the computing device 800 shown in FIG. 8.

FIG. 8 is a block diagram of a computing system 800 in which one or more disclosed embodiments may be implemented. The computing system 800 may include, for example, a computer, a switch, a router, a gaming device, a handheld device, a set-top box, a television, a mobile phone, or a tablet computer. The computing device 800 may include a processor 802, a memory 804, a storage 806, one or more input devices 808, and/or one or more output devices 810. The device 800 may include an input driver 812 and/or an output driver 814. The device 800 may include additional components not shown in FIG. 8.

The processor 802 may include a central processing unit (CPU), a graphics processing unit (GPU), a CPU and GPU located on the same die, or one or more processor cores, wherein each processor core may be a CPU or a GPU. The memory 804 may be located on the same die as the processor 802, or may be located separately from the processor 802. The memory 804 may include a volatile or non-volatile memory, for example, random access memory (RAM), dynamic RAM, or a cache.

The storage 806 may include a fixed or removable storage, for example, a hard disk drive, a solid state drive, an optical disk, or a flash drive. The input devices 808 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 810 may include a display, a speaker, a printer, a haptic feedback device, one or more lights, an antenna, or a network connection (e.g., a wireless local area network card for transmission and/or reception of wireless IEEE 802 signals).

The input driver 812 may communicate with the processor 802 and the input devices 808, and may permit the processor 802 to receive input from the input devices 808. The output driver 814 may communicate with the processor 802 and the output devices 810, and may permit the processor 802 to send output to the output devices 810. The output driver 816 may include an accelerated processing device ("APD") 816 which may be coupled to a display device 818. The APD may be configured to accept compute commands and graphics rendering commands from processor 802, to process those compute and graphics rendering commands, and to provide pixel output to display device 818 for display.

In an example, with reference to FIG. 1, the point source 110, packet devices 112 ad 118, optical devices 122-132, and/or POGs 114, may be implemented, at least in part, with the components of computing device 800 shown in FIG. 8.

It should be understood that many variations are possible based on the disclosure herein. Although features and elements are described above in particular combinations, each feature or element may be used alone without the other features and elements or in various combinations with or without other features and elements.

The methods and elements disclosed herein may be implemented in/as a general purpose computer, a processor, a processing device, or a processor core. Suitable processing devices include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods, flow charts and elements disclosed herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A device configured for multi-layer in-band telemetry in a packet-optical network, the device comprising:
   a processor coupled to at least one interface;
   the at least one interface configured to receive, at a packet layer, a packet including at least a header and a payload;

the processor configured to:
  read intent information from the header, wherein the intent information includes a request for flow tracing information;
  translate the intent information from the packet layer to generate a device-specific action in an optical layer, wherein the device-specific action provides at least one globally unique identifier (ID) associated with the device;
  execute the device-specific action in the optical layer to generate a response corresponding to the intent, wherein the response includes the at least one globally unique identifier associated with the device;
  associate the response with the intent; and
  encode the response in the packet layer and provide the response to the at least one interface for downstream data forwarding.

2. The device of claim 1, wherein the at least one globally unique ID associated with the device includes at least one of the following: a node ID of the device; an ingress port ID for the device; an egress port ID for the device; a link ID for a link connected to the device; a path ID associated with a network path traversed by the packet; a service ID for a service operating at the device; a function ID for a function operating at the device; or a virtual network function (VNF) ID for a VNF operating at the device.

3. The device of claim 1, wherein the at least one globally unique ID associated with the device is a 16-byte universally unique ID (UUID).

4. The device of claim 3, wherein only a portion of the 16-byte UUID is included in the response.

5. The device of claim 1, wherein the request for flow tracing information includes a request for at least one of the following: node tracing; port tracing; link tracing; path tracing; service tracing; or function tracing.

6. The device of claim 1, wherein the generated response further includes at least one of the following: a functional node name for the device; a geographical location name for the device; or a role within the packet-optical network name for the device.

7. The device of claim 1, wherein the generated response further includes at least one port identifier for a port within the device.

8. The device of claim 1, wherein the generated response further includes at least one link identifier for a link connected to the device.

9. The device of claim 1, wherein the intent information further includes, for each network layer, an independent coefficient of a random polynomial for calculating proof-of-transit (POT) of the packet, wherein:
  the processor is further configured to compute, at a packet layer, a polynomial sum of the independent coefficient of the random polynomial and a secret and constant polynomial; and
  the processor is further configured to insert the computed polynomial sum into the response.

10. The device of claim 9, wherein the secret and constant polynomial is configured by a network controller or operator.

11. A method performed by a device configured for multi-layer in-band telemetry in a packet-optical network, the method comprising:
  receiving, at a packet layer, a packet including at least a header and a payload;
  reading intent information from the header, wherein the intent information includes a request for flow tracing information;
  translating the intent information from the packet layer to generate a device-specific action in an optical layer, wherein the device-specific action provides at least one globally unique identifier (ID) associated with the device;
  executing the device-specific action in the optical layer to generate a response corresponding to the intent, wherein the response includes the at least one globally unique identifier associated with the device;
  associating the response with the intent; and
  encoding the response in the packet layer and providing the response for downstream data forwarding.

12. The method of claim 11, wherein the at least one globally unique ID associated with the device includes at least one of the following: a node ID of the device; an ingress port ID for the device; an egress port ID for the device; a link ID for a link connected to the device; a path ID associated with a network path traversed by the packet; a service ID for a service operating at the device; a function ID for a function operating at the device; or a virtual network function (VNF) ID for a VNF operating at the device.

13. The method of claim 11, wherein the at least one globally unique ID associated with the device is a 16-byte universally unique ID (UUID).

14. The method of claim 13, wherein only a portion of the 16-byte UUID is included in the response.

15. The method of claim 11, wherein the request for flow tracing information includes a request for at least one of the following: node tracing; port tracing; link tracing; path tracing; service tracing; or function tracing.

16. The method of claim 11, wherein the generated response further includes at least one of the following: a functional node name for the device; a geographical location name for the device; or a role within the packet-optical network name for the device.

17. The method of claim 11, wherein the generated response further includes at least one port identifier for a port within the device.

18. The method of claim 11, wherein the generated response further includes at least one link identifier for a link connected to the device.

19. The method of claim 11, wherein the intent information further includes, for each network layer, an independent coefficient of a random polynomial for calculating proof-of-transit (POT) of the packet, further comprising:
  computing, at a packet layer, a polynomial sum of the independent coefficient of the random polynomial and a secret and constant polynomial; and
  inserting the computed polynomial sum into the response.

20. The method of claim 19, wherein the secret and constant polynomial is configured by a network controller or operator.

* * * * *